United States Patent
Deng

(10) Patent No.: US 11,176,817 B2
(45) Date of Patent: Nov. 16, 2021

(54) GUIDING SIGNS SYSTEM AND INFORMATION PROCESSING METHOD THEREOF

(71) Applicant: Wenlun Li, Beijing (CN)

(72) Inventor: Qisi Deng, Beijing (CN)

(73) Assignee: Wenlun Li, Beijing (CN)

( * ) Notice: Subject to any disclaimer, the term of this patent is extended or adjusted under 35 U.S.C. 154(b) by 0 days.

(21) Appl. No.: 16/596,654

(22) Filed: Oct. 8, 2019

(65) Prior Publication Data

US 2020/0111353 A1   Apr. 9, 2020

Related U.S. Application Data

(60) Provisional application No. 62/742,725, filed on Oct. 8, 2018.

(51) Int. Cl.
| | |
|---|---|
| G08G 1/081 | (2006.01) |
| G08B 7/06 | (2006.01) |
| G08G 1/09 | (2006.01) |
| G06F 3/14 | (2006.01) |
| G08G 1/01 | (2006.01) |
| G01C 21/34 | (2006.01) |

(52) U.S. Cl.
CPC ........... *G08G 1/081* (2013.01); *G06F 3/1423* (2013.01); *G08B 7/066* (2013.01); *G08G 1/0145* (2013.01); *G08G 1/09* (2013.01); *G01C 21/3453* (2013.01)

(58) Field of Classification Search
CPC .............................. G08B 7/066; G06F 3/1423
See application file for complete search history.

(56) References Cited

U.S. PATENT DOCUMENTS

| | | | | |
|---|---|---|---|---|
| 2007/0275750 | A1* | 11/2007 | Nakagawa | H04M 1/72424 455/550.1 |
| 2009/0138353 | A1* | 5/2009 | Mendelson | G06Q 90/20 705/14.39 |
| 2010/0302048 | A1* | 12/2010 | Mahajan | G08B 7/062 340/605 |
| 2014/0019036 | A1* | 1/2014 | Lemay | G01C 21/34 701/400 |
| 2015/0130350 | A1* | 5/2015 | Braunstein | H05B 47/11 315/86 |
| 2015/0204683 | A1* | 7/2015 | Stahlin | G01C 21/3415 701/411 |

\* cited by examiner

*Primary Examiner* — Fabricio R Murillo Garcia
(74) *Attorney, Agent, or Firm* — Hauptman Ham, LLP

(57) ABSTRACT

A guiding signs system may include a plurality of guiding signs for outputting information and an information processor to acquire marching needs and path sets of objects, wherein the marching need includes quantities of objects and the path sets include all passages from a starting point to an end point; the passages include nodes and roads in between, and each node has one or more guiding signs, wherein the information processor calculates each object's distribution in the path sets according to the marching needs, and determine each object's priority on each road according to each object's distribution in the path sets, each guiding sign is configured to output the information of each object's priority on each road.

6 Claims, 5 Drawing Sheets

GUIDING SIGNS SYSTEM AND INFORMATION PROCESSING METHOD THEREOF

FIELD OF INVENTION

The invention involves in communication signs, more particularly in information processing of guiding signs system.

BACKGROUND OF THE INVENTION

With continuous progress of modernization, China has put forward strategic construction goal of smart cities in order to improve level of smart management, realizing urban sustainable development. The urban system of guiding signs has been blooming ever since.

Among current guiding signs system, some guiding signs are set with LED devices in which LIFI devices transit signals. In such way LIFI technology is applied with signage, promising pedestrians the access to the Internet. Some guiding signs have sensors, transforming information into output signals before sending them to control units, which then send out signal in order to control light color or light brightness. Some can search ways of transportation to destination and time data via message, while some can broadcast information via LED screen.

However due to scattered positions, low efficiency in use, absence of signage standard in size, letters, direction and color, it is very unlikely to find a complete path to destination via guiding signs.

SUMMARY OF THE INVENTION

It is an object of the present invention to provide accurate guiding signs.

It is a further object of the invention to enable guiding signs to reduce traffic pressure in crowded areas.

The invention especially provides a guiding signs system, which comprises multiple guiding signs, outputting guiding information and information processors, which is to acquire marching needs and path sets of objects. The need includes quantity of objects. The path sets may include all passages from the beginning to the finishing points. The passages may include nodes and roads in between. Every node is set with one or more guiding signs to calculate the object's distribution of path sets on the basis of needs, to predict object's priority in roads between nodes on the basis of distribution of path sets, and to facilitate guiding signs in every node with prioritized guiding information.

In one embodiment, the guiding signs may include multi-direction signs, set on crossroads of mentioned nodes, which are sub-signs to various directions and can form prioritized sign image via change in color and/or pattern of sub-signs.

In another embodiment, the guiding signs may include dynamic screens, set on the nodes, showing ambient aggregate passenger throughput and guidance information in order to form prioritized sign image.

In still another embodiment, the guiding signs may include emergency sensors to detect emergencies within the path sets, and the system of guiding signs may include emergency evacuation signs informing evacuation direction in case of emergency.

In a further embodiment, the guiding signs may include information gathering devices to calculate the need via mobile devices or path inquiries of the object.

In still a further embodiment, the information gathering devices can use the prioritized path algorithm via Ant Colony System to assure the aggregate passenger throughput of objects in every road.

The invention also provides an information processing method to acquire needs and path sets of objects. The need may include quantity of objects. The path sets may include all passages from the beginning to the end. The passages may include nodes and roads, and every node has one or more guiding signs to calculate object's distribution of path sets on the basis of needs, to predict object's priority in roads between nodes on the basis of distribution of path sets, and to facilitate guiding signs in every node with prioritized guiding information.

In one embodiment, the algorithm of object's distribution of path sets includes the prioritized path algorithm via Ant Colony System to assure the aggregate passenger throughput of every road.

In another embodiment, the prioritized path algorithm may include a step of acquiring the beginning/finishing point of road and the need via path sets, assuring the quantity of objects via the need, setting up pheromone initial value and flow value of every road, calculating the reciprocal of all roads length, regarding the object as a starting point, assuring the next path when it is the object's turn to choose, and updating all pheromone and flow value of next path.

In a further embodiment, the prioritized path algorithm may include updating path pheromone when all objects approach the end, re-setting pheromone initial value and flow value of every road, and calculating the reciprocal of all roads length, regarding the object as a starting point until all objects have chosen paths.

The information processing and guiding signs system can acquire marching need and path sets, and then calculate throughput allocation in path set to assure object's priority, matching output information with prioritized guiding information in order to reduce traffic pressure.

Furthermore, the information processing and guiding signs system may comprise multi-direction signs, set on crossroads of mentioned nodes, are set of sub-signs to various directions and can form prioritized sign image via change in color and/or pattern of sub-signs. Dynamic screens, set on the nodes, showing ambient aggregate passenger throughput and guidance information in order to form prioritized sign image. Emergency sensors to detect emergency within the path sets. And the system of guiding signs comprises: emergent evacuation signs informing objects about evacuation direction in case of emergency. With multiple signs coordinating with each other and multiple changing modes of guiding information, it becomes more convenient for the objects.

DETAILED DESCRIPTION OF THE PRESENT INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
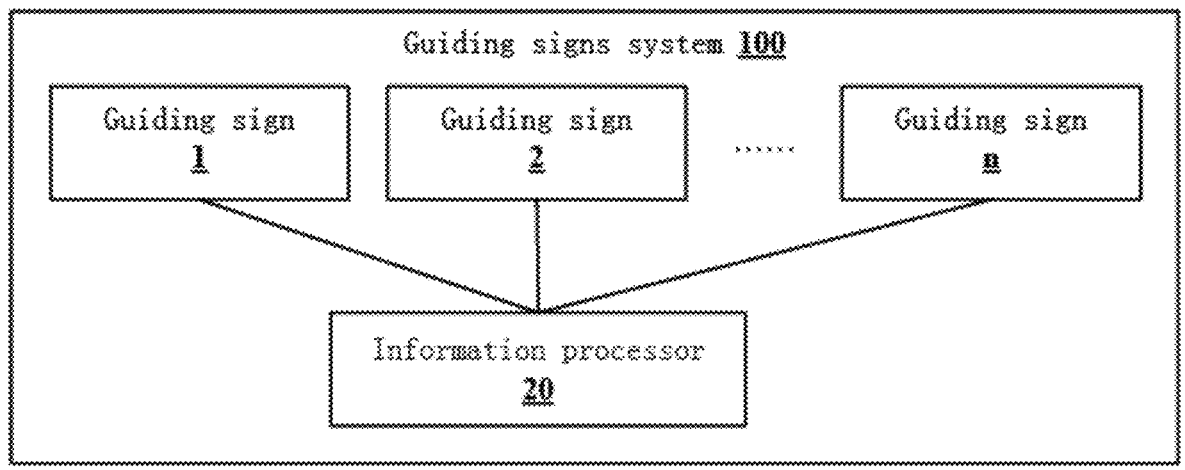
FIG. 1 is a structure diagram of the guiding signs system in the present invention.

The application provides a guiding signs system 100 which efficiently directs objects to destination via a reasonable path and at the same time reduces road traffic pressure. FIG. 1 is a structure diagram of the guiding signs system, which generally comprises multiple guiding signs and an information processor 20.

The guiding sign (1, 2, 3 . . . n) is to output information respectively. The information processor 20 is to acquire needs and path sets of objects, and the need includes quantity of objects. The path sets may include all passages from the beginning to the end. The passages may include nodes and roads and every node has with one or more guiding signs to calculate object's distribution of path sets on the basis of needs, to predict object's priority in roads between nodes on the basis of distribution of path sets, and to facilitate guiding signs in every node with prioritized guiding information.

Objects obtain guiding information from guiding signs where option to path lies. The information processor 20 collects sign data from guiding signs and adjusts output information via the Internet.

Figure 2:
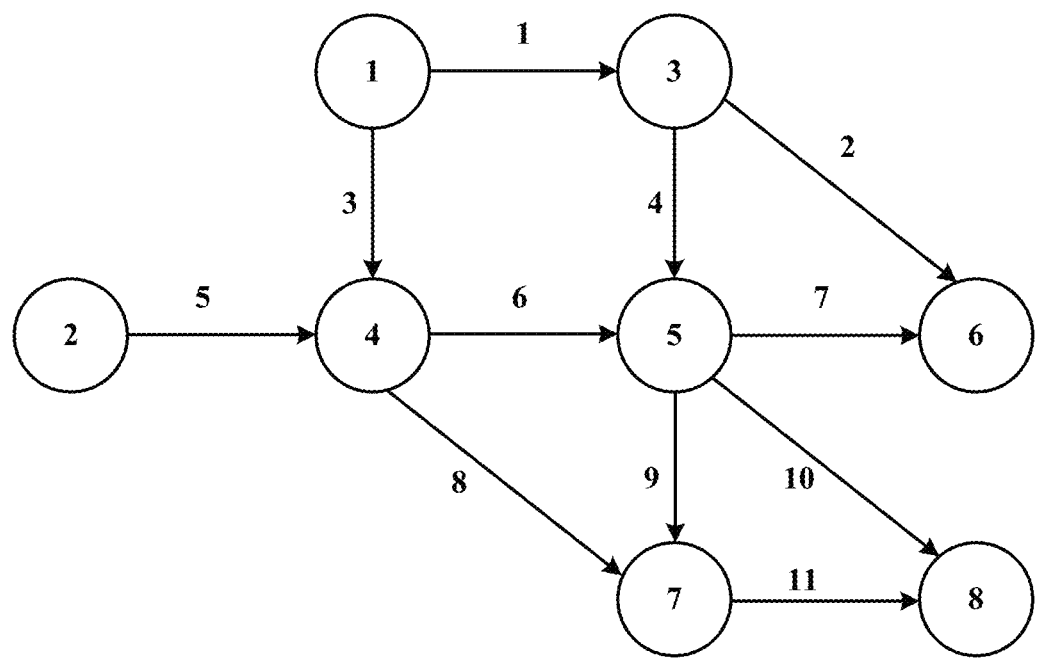
FIG. 2 is a diagram of marching path sets in guiding signs system in the present invention.

FIG. 2 is a diagram of marching path sets in guiding signs system 100. As suggested, the node set is {①, ②, ③, ④, ⑤, ⑥, ⑦, ⑧}; road set is {1,2,3,4,5,6,7,8,9,10,11}; beginning point set O is {①, ②}: O1 is ① and O 2 is ②; and finishing point set D is {⑥, ⑧}: D1 is ⑥, and D2 is ⑧. Among the sets, there are 4 OD and 12 road paths, thus path sets are:

(O1, D1), Path x1 marches nodes ①→③→⑥; Path x2 marches nodes ①→③→⑤→⑥; Path x3 marches nodes ①→④→⑤→⑥.

(O1, D2), Path x4 marches nodes ①→③→⑤→⑧; Path x5 marches nodes ①→③→⑤→⑦→⑧; Path x6 marches nodes ①→④→⑤→⑧; Path x7 marches nodes ①→④→⑦→⑧.

(O2, D1), Path x9 marches nodes ②→④→⑤→⑧.

(O2, D2), Path x10 marches nodes ②→④→⑤→⑧; Path x11 marches nodes ②→④→⑤→⑦→⑧; Path x12 marches nodes ②→④→⑦→⑧.

Figure 3:
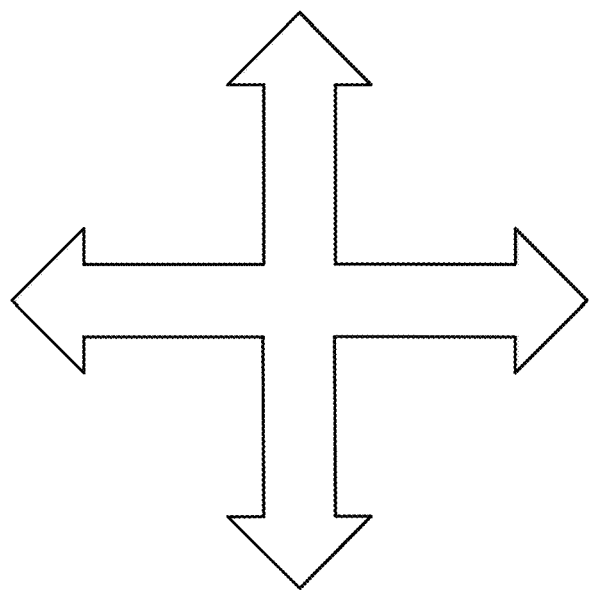
FIG. 3 is a vertical view of the guiding sign in the present invention.
Figure 4:
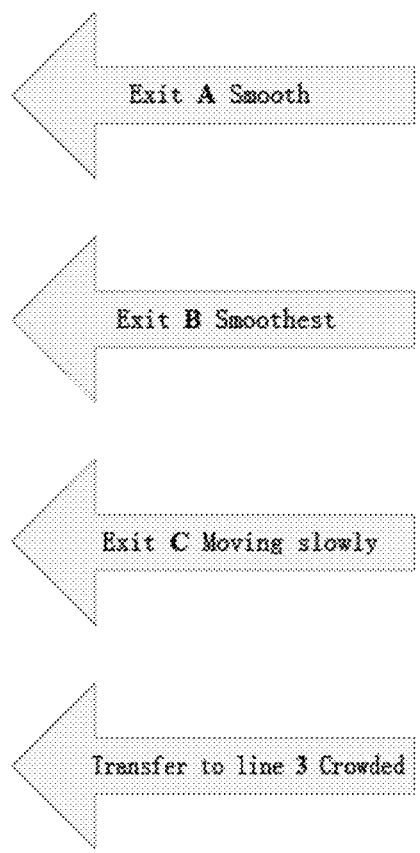
FIG. 4 is a diagram of sub-sign of FIG. 3 sign.

Information processor 20 can assure object's priority of path at every node via distribution in order to facilitate output information with prioritized guiding information. Such object can be either pedestrians or vehicles or moving targets within, whereas guiding signs in guiding signs system 100 can be in numerous forms, coordinating with each other and changing guiding information so as to direct objects to reasonable path. FIG. 3 is a vertical view of such sign. FIG. 4 is a diagram of sub-sign of FIG. 3 sign.

It is important to note that such guiding signs are often multi-direction signs, set on crossroads of mentioned nodes, are set of sub-signs to various directions and can form prioritized sign image via change in color and/or pattern of sub-signs. More specifically, each sub-sign can change brightness, color and letter to different attention, road distribution and key roads. Roads starting from the same nodes are marked in this way: brighter signs suggest heavier crowd and vice versa; dark red means crowded path; medium yellow implies enough crowd and light green denotes smooth path; and flickering light indicates key destination.

Aggregate passenger throughput and traffic information can be updated along with real-time data of guiding signs system 100: brightness, color and letters. Users can choose the quickest way to next destination in one node to the other, forming a quick path.

In one embodiment, guiding signs may include dynamic screens on the nodes, showing ambient aggregate passenger throughput and guidance information in order to form prioritized sign image. Dynamic screens are can be disposed in each node, suggesting ambient aggregate passenger throughput with color, brightness and letters. Particularly speaking one footage shows road information, one for direction to the road. Color is used for congestion and aggregate passenger throughput. Words as "Crowded", "Clear" and "Recommended path" are applied as well.

Among other embodiments, larger LED screen attracts more attention with low energy. LED screen updates real time data: direction and congestion. Such data changes location and area on screen now and then.

Figure 5:
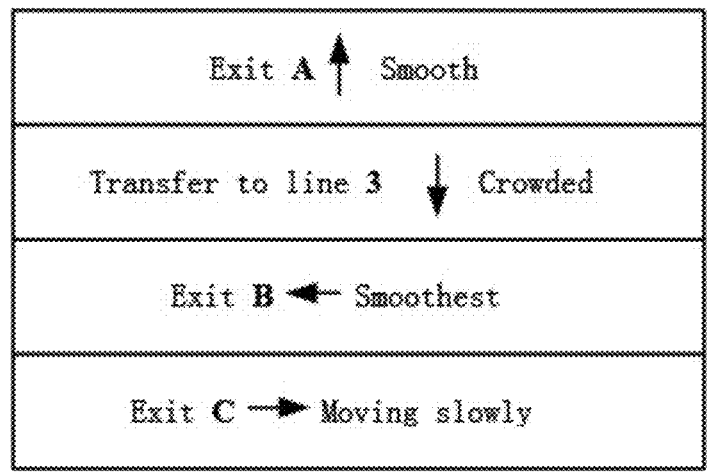
FIG. 5 is a diagram of another guiding sign in the present invention.
Figure 6:
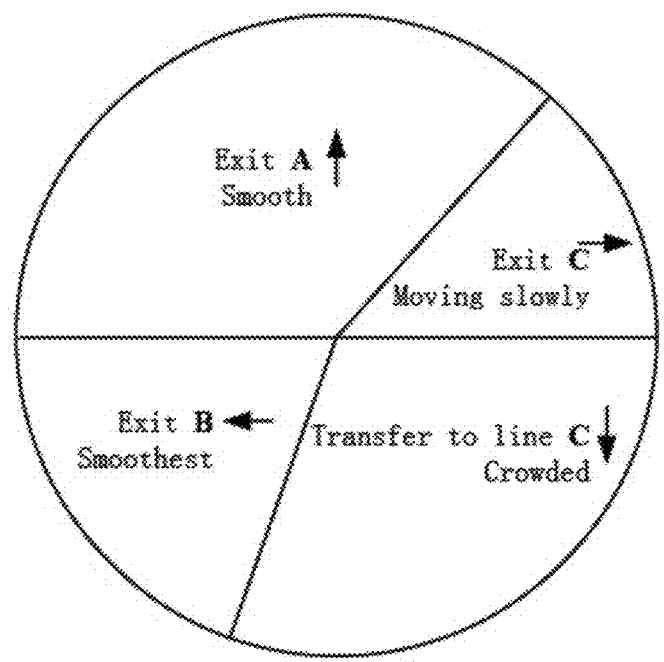
FIG. 6 is a diagram of another guiding sign in the present invention.

FIG. 5 is a diagram of another guiding sign in guiding signs system 100, stating aggregate passenger throughput and directions. FIG. 6 is a diagram of another guiding sign in guiding signs system 100, stating aggregate passenger throughput with area. Guiding signs in FIG. 5 and FIG. 6 show all directions and recommended path. In other examples, priority of congestion to directions is ranked.

Meanwhile aggregate passenger throughput information can be updated along with real-time data of guiding signs system 100 and path information changes respectively. Users can choose the quickest way to next destination in one node to the other.

In one embodiment, the guiding signs system 100 may include emergency sensors to detect emergency within the path sets, and emergent evacuation signs informing objects about evacuation direction in case of emergency.

In case of emergency, the brightness of emergency evacuation sign should be increased and make other signs show evacuation direction. Emergency service staff should lead the crowd to safe and open area and evacuate people from congestion sites to provide passage for aid personnel.

Figure 7:
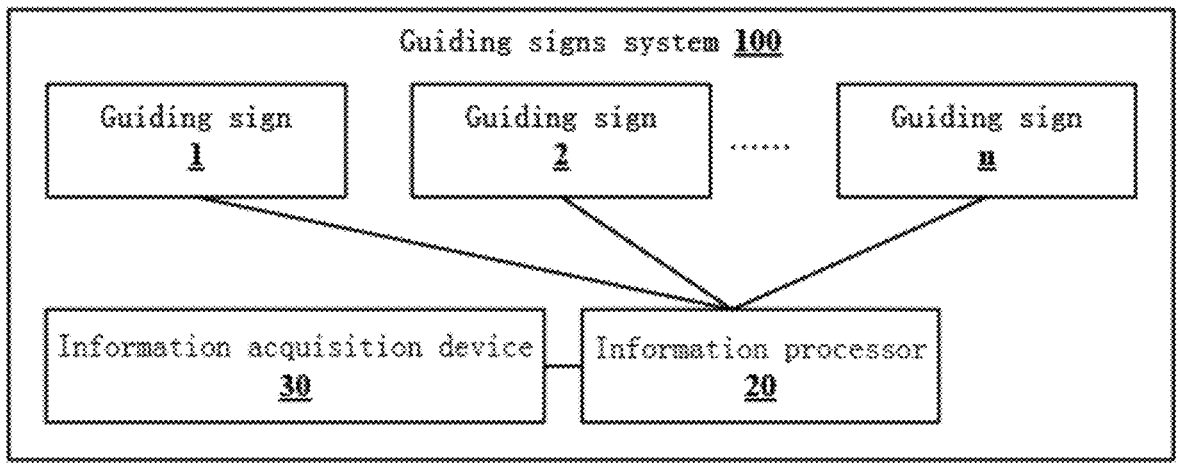
FIG. 7 is a structure diagram of the guiding signs system in the present invention.

FIG. 7 is a structure diagram of the guiding signs system 100 which contains information acquisition device 30, which can acquire marching need from mobile devices and searching information of objects. Among mobile devices are RF cards: subway card, bus IC card and NFC tickets to predict marching direction. Here are specific examples:

When objects are subway visitors with one-way tickets. Ticket number can be restored in guiding signs system 100. Route information is read inside ticket when passenger buys it and erased when the visitor leaves the station. Travel pattern is achieved after a certain period of time. Information acquisition device 30 can acquire such route data via ticket vending machine and ticket office.

The guiding signs system 100 divides the path from starting station to destination into three stages. In stage 1, guiding signs system 100 collects path information when visitors buy tickets, taking ticket machine/office as starting point, destination station as the end, and recommends path via crowd and algorithm. In stage 2, guiding signs system 100 does not add up more data since visitors are inside the cable. In stage 3, guiding signs system 100 directs crowd to subway exits, marking visitor's position as destination platform according to timetable of subway or exact arrival time of subway.

When mobile devices are subway/bus IC cards with sequence number, it takes one or two weeks to obtain travel pattern and recommend paths of card owners and plan path during rush hour. The sequence number is uploaded to guiding signs system 100 when IC card is recognized. The guiding signs system 100 can also detect from previous record the most popular route during commuting hour to manage guiding signs. Generally, the commuting circle is a week. The NFC tickets can be ID card, social insurance card, residency card, key pass, bank card and shopping card. They can identify users to obtain path information.

Identification and social welfare information in ID card, social insurance card can be used to collect path information of hospitals, libraries, parks and government buildings. The guiding signs system 100 can detect user's path information via these cards because they cover check-in information, library record and business record. In some embodiments, multi-media inquiry devices can read NFC cards. Such devices can be but not be limited to PC computer, SCM and electronic information equipment of embedded system. When users put the card into such device, the device collects users' identity and detect places they visit the most in hospital, library, park and government office as well as inquiry history to specific department in hospital, the book-shelf in library, place in park and office desk in government building. The path information is formed and then sent to guiding signs.

It is noted that when it involves key pass. the users have a fixed route to office/home which the guiding signs system 100 can obtain from property service center. The guiding signs system takes entrance as starting point and office/home as the end immediately when key pass is read and then recommends path and manage signs. The NFC card is also applied in bank cards (with Quick Pass), cellphones and shopping cards. The guiding signs system 100 can analyze shopping habits and predict possible destination via transaction history from POS terminals. It can recommend path and manage signs.

Furthermore, marching need can be obtained through searching data of objects. Objects can search path on inquiry device or navigation app. Among the inquiry devices can be but not limited to PC, SCM and electronic information equipment of embedded system, which can analyze voice and text messages from object. Navigation apps (Baidu map and Gaode map) provide possible paths to desired places (houses, buildings and malls). For example, when object enters "clothes", the apps show ways to all clothing stores. The guiding signs system 100 analyzes search data in cellphones and provides paths to the destination.

After analyzing marching directions, data of objects, odd calculation and target are achieved. Given capacity of road and nodes, starting and finishing points of target object should be tracked continuously, which can direct visitors to recommended destinations to reduce traffic pressure. Then space positions, key people's information, travel time and circle are collected to plan prioritized paths in guiding signs system 100. Thus it can prevent visitors from being late for work during commuting hours giving them priority over pedestrians.

After analyzing marching directions of objects, the guiding signs system 100 separates marching roads into node sets and path sets. For instance (O1, D1) (①→⑥ in FIG. 2) separates in to Path x1, Path x2, Path x3; (O1, D2) (①→⑧ in FIG. 2) separates in to Path x4 to Path x8. Sometimes node sets and path sets can be combined, containing some roads and nodes. For instance, both in node set {①, ③, ④, ⑤}, road set {①→③, ③→⑤, ④→⑤, ①→④}, and path set (O1, D1) and path set (O1, D2), people march node ① to node ⑤ via sub-road path ①→③→⑤, ①→④→⑤.

The Ant Colony System (ACS) is an algorithm, inspired from ants finding the quickest way from nest to food, widely applied in secondary allocation, Job-shop managing, etc. The guiding signs system 100 links ACS, updating pheromones rules with path equation and function, and combining delay effect with algorithm of visitor number and road resistant to achieve SE need prioritization.

In the first place, the formula of urban road network is G=(V, E), V is node set, E is path set. L is a set of starting/finishing points of G as (r, s): L={(r,s)|r∈R, s∈S, R∪S⊆V}, R is the set of starting points and S is the set of finishing points. In path of OD, visitor (object) chooses paths: the shortest way in general urban road network and shorter and quickest way in heavy network. Formula of path choice is:

$$P_{ij}^k = \frac{x_{ij}^k \times u_{ij}^k(t)}{\sum_{l \in N_i} [x_{il}^k \times u_{il}^k(t)]} \qquad (1)$$

Wherein k is visitor, i and j are the current node the following node. In j∈Ni, Ni is set of following nodes. $x_{ij}^k$ shows the possibility that Visitor (object) K chooses node j and $\Sigma x_{ij}^k=1$. $u_{ij}^k(t)$ means the utility of node j. $P_{ij}^k$ indicates the shift chance when Visitor (object) K takes node j as finishing node in node i.

The following constraints should be followed when solving ACS-based dynamic path choice:

Condition One: path should be one way duet to specific direction of OD.

Condition Two: the following node should be next to the currents one, may it be two to three.

Condition Three: quantity of visitor (object) varies with OD need. Every node produces new visitor throughput. The sum of input and new throughput in current node equals the quantity of output throughput.

Condition Four: there is no input or put throughput in road network originally.

The path choice of visitor (object) is based on pseudo-random transfer rule. Given $q_0(0 \leq q_0 \leq 1)$ as a parameter, q in [0, 1] is generated when a choice is made. By analysis of q and $q_0$, it should be followed the rule:

$$P_{ij}^k = \begin{cases} \arg\max\{\tau_{ij} \times (\psi_{ij} \times \eta_{ij})^\beta\}, & q \leq q_0 \\ \dfrac{\tau_{ij} \times (\psi_{ij} \times \eta_{ij})^\beta}{\sum_{l \in A} \tau_{ij} \times (\psi_{ij} \times \eta_{ij})^\beta}, & q > q_0 \end{cases} \quad (2)$$

Formula (2) is further explanation of Formula (1), where $P_{ij}^k$ shows the possibility that Visitor (object) K chooses path (i, j); $\tau_{ij}$ indicates pheromone of path (i, j); $\Psi_{ij}$ means the reciprocal of throughput in path (i, j), and when throughput is 0, $\Psi_{ij}=1$; $\eta_{ij}$ suggests reciprocal of length of path (i, j); β is utilization coefficient; A is set of nodes which node i can reach. When q≤q0, visitor (object) is more likely to choose low throughput and shorter path with information and path length. When q>$q_0$, visitor (object) is more likely for a new path among via chances transfer rule.

When visitor (object) chooses a popular path, he/she releases certain pheromone as triggering factor for another visitor (object). When more visitors (objects) choose the same path, increasing its pheromone and reducing its utilization. To avoid this low utilization, instruction rules of updating pheromone are necessary:

Rule No. One of updating pheromone: update pheromone with Formula (3) when multiple visitors (object) choose path in every O-D:

$$\tau_{ij} \leftarrow (1-\alpha)\tau_{ij} + \alpha\Delta\tau_{ij}^{bs}, \forall(i,j) \in T^{bs} \quad (3)$$

Wherein $\tau_{ij}$ is pheromone of path (i, j), α is volatilization parameter; $\Delta\tau_{ij}^{bs}$ is the increased pheromone of the path, $T^{bs}$ is most high-efficient path in O-D.

Rule No. Two of updating pheromone: update pheromone with Formula (4) when every visitor (object) choose path:

$$\tau_{ij} \leftarrow (1-\xi)\tau_{ij} + \xi\tau_{ij}^0 \quad (4)$$

Wherein $\tau_{ij}$ is pheromone of path (i, j), $\tau_{ij}^0$ is original value of it, ξ is volatilization parameter of such pheromone.

Rule No. Three of updating nodes throughput: the time frame of study should be divided, given the scattered decision pattern of visitor (object) about nodes. That is to divide considering time frame [0, T] into N sections. Visitors or vehicles entering the same road path cannot leaving at the same time.

Formula of path during all time frame is:

$$x_a^S(n) = x_a^S(n-1) + u_a^S(n-1) - v_a^S(n-1) \quad (5)$$

Wherein $\forall a \in E$, $\forall s \in S$, n=1, 2, ..., N; $u_a^S(n-1)$ shows the throughput of entering path a to finishing point s at the time frame of n−1; $v_a^S(n-1)$ shows the output throughput of leaving path a for finishing point s at the time frame of n−1; $x_a^S(n-1)$ and $x_a^S(n)$ indicate respectively traffic load at the time frame of n−1 and n.

The rule of updating nodes throughput is applied for energy statement of nodes. The sum of input throughput and new throughput equals output throughput of the node. The rule is as such in Formula (6):

$$\Sigma_{a \in A_l} v_a^s(n) + g_l^s(n) = \Sigma_{a \in B_l} u_a^s(n) \quad (6)$$

Wherein $\forall l$, $s \in V$, $l \neq s$, $\forall n \in [1,N]$; $A_1$ is the set of path entering node 1; $B_1$ is the set of path leaving node 1; $g_1^s(n)$ is the throughput leaving for finishing point s in node 1 at the nth time frame. When there is no input throughput from other path, then $\Sigma_{a \in A_l} v_a^s(n)$ is zero.

Variable structure in algorithm is applied: firstly, path capacity vector $Q=(Q_1, Q_2, \ldots, Q_n)$: $Q_a=1_a \times e_{am}$: a indicates path, $1_a$ is length of a, $e_{am}$ is the maximum traffic density; secondly, original resistance vector $t_{0a}=(t_{01}, t_{02}, \ldots, t_{0n})$: $t_{0a}=1_a/v_f$, a indicates path, $v_f$ is speed; thirdly, when n≠0, the resistance vector $t_{0a}=(t_{01}, t_{02}, \ldots, t_{0n})$ at the time frame of n:

$$t_{na} = t_{na}\left\{1 + \alpha'\left(\frac{x_a(n)}{Q_a}\right)^{\beta'}\right\},$$

$x_a(n)$ is throughput of path a at the time frame of n, $Q_a$ is capacity of the path, α' and β' are adjusting parameters.

Accuracy analysis of algorithm concludes two parts: firstly, to assure the up limit of path pheromone can be calculated via Formula (2), and inspiring information is determined by throughput and distance. Thus path choice is predictable as long as there is accurate up limit of pheromone. Secondly to further assure its accuracy via result comparison between allocation of added value and that of balance.

In issue of ACS-DRC, pheromone $\tau_{ij}$ of path (i, j) is applicable in Formula (7), along with updating rules of path and pheromone:

$$\lim_{k \to \infty} \tau_{ij}(k) \leq \tau_{max} = g(s^*) \quad (7)$$

Wherein g(s*) indicates maximum added value of pheromone in path (i, j). In path choice of ACS-DRC algorithm, pheromone is updating via Formula (3) when visitor (object) fails to choose path. Formula (4) is applied when multiple visitors (objects) in O-D path chooses path. Both pheromone is showed in $\partial_{k+1}=(1-\varphi)\cdot\partial_k+\varphi\cdot b\cdot\partial_{k+1}$ and $\partial_k$ indicate $\tau_{ij}(k+1)$ and $\tau_{ij}(k)$, φ means α or ξ, b means $\Delta\tau_{ij}$, whose maximum value is g(s*), is the best allocation. Maximum pheromone at various time frame is:

$\partial_1=(1-\varphi)\cdot\partial_0+\varphi\cdot b,$ $\partial_2=(1-\varphi)\cdot[(1-\varphi)\cdot\partial_0+\varphi\cdot b]+\varphi\cdot b, \ldots,$ $\partial_k=\Sigma_{i=1}^k(1-\varphi)^{k-i}\cdot\varphi\cdot b+(1-\varphi)^k\partial_0$, thus $\lim_{k \to \infty}\partial_k=\lim_{k \to \infty}(\Sigma_{i=1}^k(1-\varphi)^{k-i}\cdot\varphi\cdot b+(1-\varphi)^k\partial_0)=b,$ $\lim_{k \to \infty}\tau_{ij}^{max}(k)=_{k \to \infty}(\Sigma_{i=1}^k(1-\varphi)^{k-1}\cdot\varphi\cdot b+(1-\varphi)^k\partial_0)=b=g(s^*).$ Therefore, the up limit of pheromone is g(s*) and path choice is predictable.

The guiding signs system 100 can acquire marching needs and path sets of objects via information acquisition device 30. It then calculates throughput allocation in path set to assure object's priority, matching output information with prioritized guiding information in order to enhance accuracy and efficiency.

Furthermore, the guiding signs system 100 can direct objects to reasonable path via coordination of guiding signs and dynamic guiding information to reduce traffic pressure.

Figure 8:
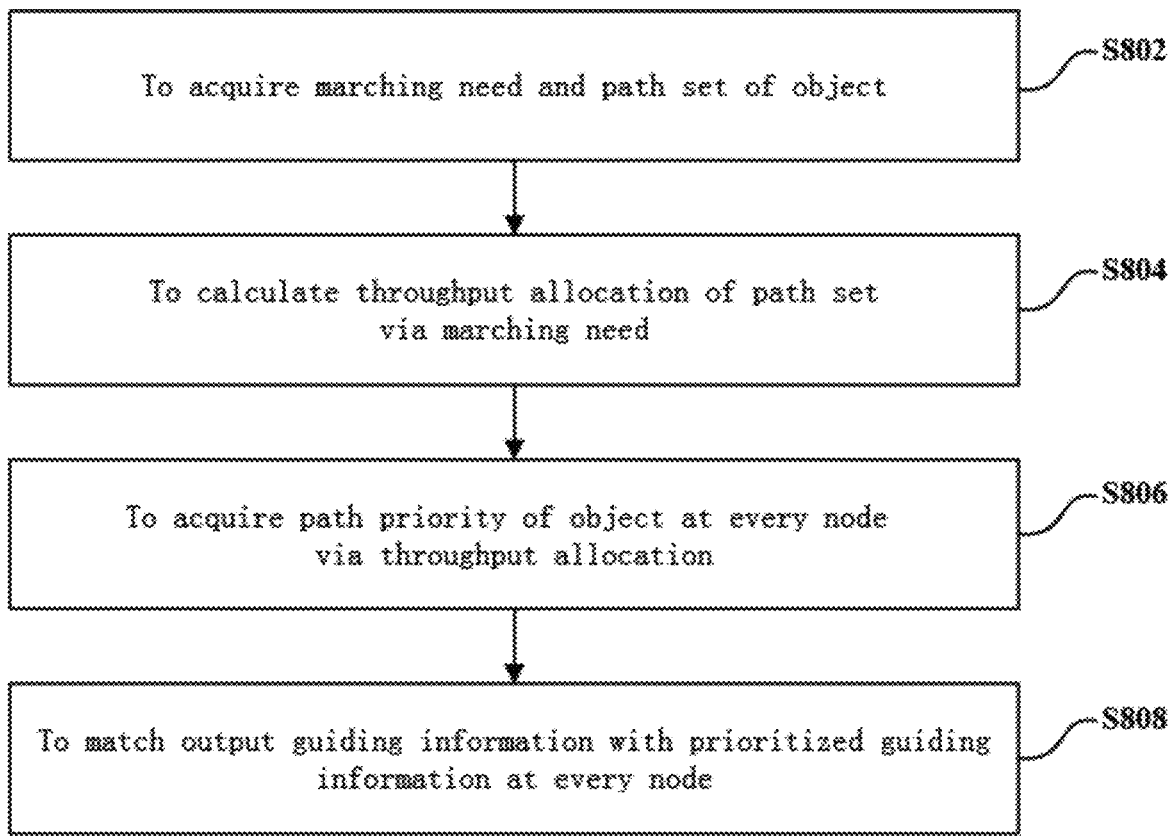
FIG. 8 is a diagram indicating information processing of the guiding signs system in the present invention.

The information processing method is applicable in mentioned guiding signs system, monitoring output guiding information via marching needs and throughput allocation. FIG. 8 is a diagram indicating information processing of the guiding signs system, applicable to the guiding sign system. As suggested steps of information processing are:

Step S802, acquiring marching need and path set of object.

Step S804 calculating throughput allocation of path set via marching need.

Step S806 acquiring path priority of object at every node via throughput allocation.

Step S808 matching output guiding information with prioritized guiding information at every node.

Among the steps, the need in Step 802 includes quantity of objects. The path sets include all passages from the beginning to the end points. The passages include nodes and roads, and every node is set with one or more guiding signs.

The guiding signs in Step S808 may include multi-direction signs, set on crossroads of nodes, which are set of sub-signs to various directions and can form prioritized sign image via change in color and/or pattern of sub-signs; dynamic screens, set on the nodes, showing ambient aggregate visitor throughput and guidance information in order to form prioritized sign image; and emergency evacuation signs informing evacuation direction in case of emergency.

The invention describes information processing of guiding signs system. The guiding signs system may include guiding signs for output information and information processors respectively to acquire the beginning/finishing point of road and the need via path sets. To assure the quantity of objects via the need.

Figure 9:
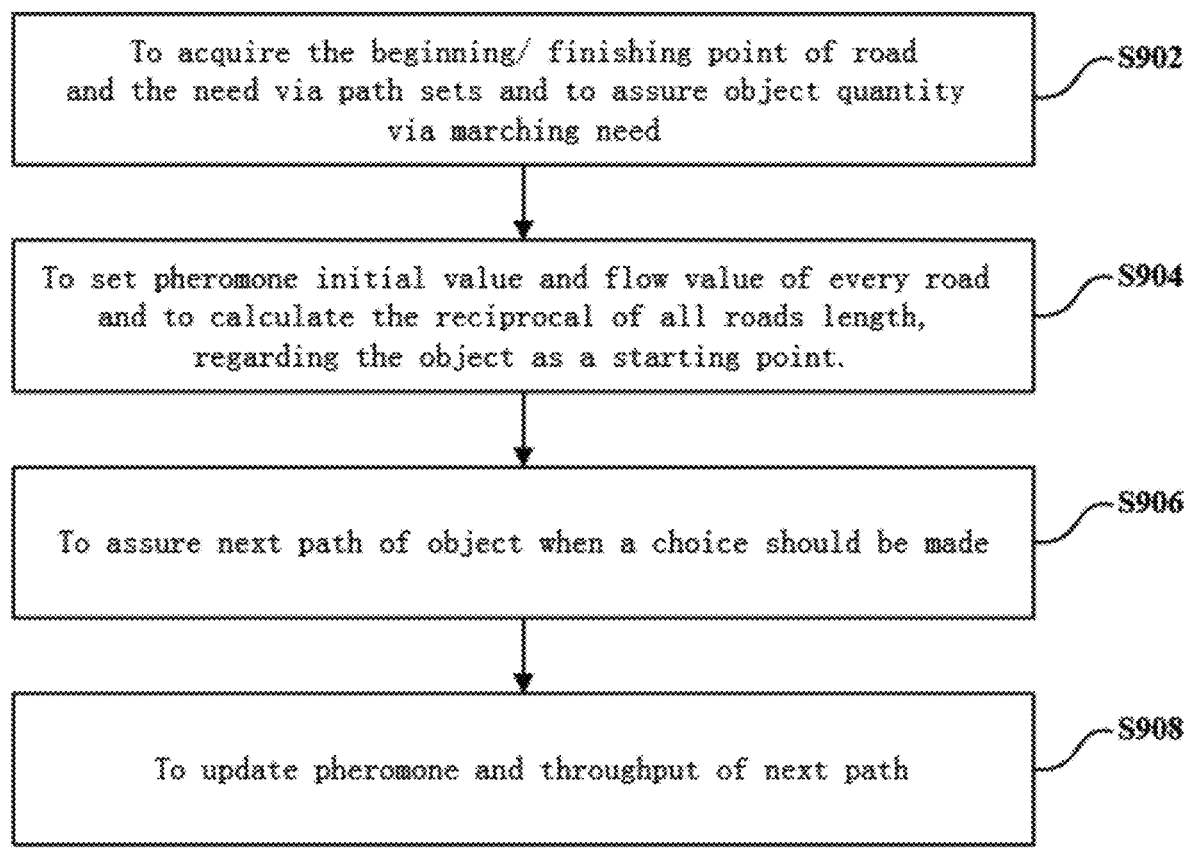
FIG. 9 is a diagram specifying information processing of the guiding signs system in the present invention.

FIG. 9 is a diagram specifying dynamic path choice algorithm in information processing of the guiding signs system and the steps are as below:

Step S902 acquiring the beginning/finishing point of road and the need via path sets and to assure object quantity via marching need.

Step S904 setting pheromone initial value and flow value of every road and to calculate the reciprocal of all roads length, regarding the object as a starting point.

Step S906, assuring next path of object when a choice should be made.

Step S908, updating pheromone and throughput of next path.

To repeat Step S906 after Step S908 until all visitors (objects) reach the finishing point in OD.

Besides, the prioritized path algorithm denotes: To update path pheromone when all objects approach the end and then to re-set pheromone initial value and flow value of every road, to calculate the reciprocal of all roads length, regarding the object as a starting point until all objects have chosen paths.

Here is the introduction of example: among path sets in FIG. 2, node set is {①, ②, ③, ④, ⑤, ⑥, ⑦, ⑧}; road set is {1,2,3,4,5,6,7,8,9,10,11}; beginning point set O is {①, ②}: O1 is ① and O 2 is ②; and finishing point set D is {⑥, ⑧}: D1 is ⑥, and D2 is ⑧. Among the sets, there are 4 OD and 12 road paths, thus path sets are:

(O1, D1), Path x1 marches nodes ①→③→⑥; Path x2 marches nodes ①→③→⑤→⑥; Path x3 marches nodes ①→④→⑤→⑥.

(O1, D2), Path x4 marches nodes ①→③→⑤→⑧; Path x5 marches nodes ①→③→⑤→⑦→⑧; Path x6 marches nodes ①→④→⑤→⑧; Path x7 marches nodes ①→④→⑦→⑧.

(O2, D1), Path x9 marches nodes ②→④→⑤→⑥.

(O2, D2), Path x10 marches nodes ②→④→⑤→⑧; Path x11 marches nodes ②→④→⑤→⑦→⑧; Path x12 marches nodes ②→④→⑦→⑧.

The marching need includes object quantity, more specifically, traffic need between paths in OD at certain time. For instance at the time of k=1, between (O1, D1) ①→⑥, object quantity is 19; (O1, D2) ①→⑧, 12; (O1, D2) ②→⑥, 8; (O2, D2) ②→⑧, 16.

At the time of k=2, between (O1, D1) ①→⑥, object quantity is 20; (O1, D2) ①→⑧, 15; (O1, D2) ②→⑥, 11; (O2, D2) ②→⑧, 15.

At the time of k=3, between (O1, D1) ①→⑥, object quantity is 17; (O1, D2) ①→⑧, 12; (O1, D2) ②→⑥, 9; (O2, D2) ②→⑧, 19.

At the time of k=4, between (O1, D1) ①→⑥, object quantity is 23; (O1, D2) ①→⑧, 15; (O1, D2) ②→⑥, 6; (O2, D2) ②→⑧, 23.

At the time of k=5, between (O1, D1) ①→⑥, object quantity is 23; (O1, D2) ①→⑧, 15; (O1, D2) ②→⑥, 11; (O2, D2) ②→⑧, 21.

At the time of k=6, between (O1, D1) ①→⑥, object quantity is 24; (O1, D2) ①→⑧, 24; (O1, D2) ②→⑥, 14; (O2, D2) ②→⑧, 31.

At the time of k=7, between (O1, D1) ①→⑥, object quantity is 25; (O1, D2) ①→⑧, 22; (O1, D2) ②→⑥, 14; (O2, D2) ②→⑧, 28.

At the time of k=8, between (O1, D1) ①→⑥, object quantity is 25; (O1, D2) ①→⑧, 19; (O1, D2) ②→⑥, 14; (O2, D2) ②→⑧, 26.

At the time of k=9, between (O1, D1) ①→⑥, object quantity is 31; (O1, D2) ①→⑧, 27; (O1, D2) ②→⑥, 18; (O2, D2) ②→⑧, 33.

At the time of k=10, between (O1, D1) ①→⑥, object quantity is 33; (O1, D2) ①→⑧, 33; (O1, D2) ②→⑥, 19; (O2, D2) ②→⑧, 37. It is noted that above figures are only for examples rather than limitation to the invention.

The road network parameters contain: traffic density $K_j=125$ pcu·km$^{-1}$; flow speed $v_f=40$ km·h$^{-1}$; marching capacity is 1250 veh/h; total time length of study is 20 min. To above 10 time frames, dynamic path choice algorithm concludes:

At the time of k=1, the throughput of path 1 is 14; 2, 5; 3, 17; 4, 9; 5, 24; 6, 18; 7, 22; 8, 19; 9, 5; 10, 4; 11, 24;

At the time of k=2, the throughput of path 1 is 30.41; 2, 11.31; 3, 28.28; 4, 18.5; 5, 43.33; 6, 35; 7, 41.93; 8, 32.83; 9, 9.96; 10, 10.44; 11, 40.33;

At the time of k=3, the throughput of path 1 is 37.78; 2, 15.74; 3, 36.42; 4, 20.36; 5, 59.29; 6, 48.08; 7, 54.16; 8, 46.36; 9, 14.88; 10, 13.99; 11, 55.13;

At the time of k=4, the throughput of path 1 is 45.78; 2, 19.55; 3, 43.31; 4, 23.71; 5, 71.83; 6, 51.7; 7, 61.13; 8, 57.63; 9, 21.78; 10, 21.05; 11, 68.82;

At the time of k=5, the throughput of path 1 is 55.33; 2, 23.83; 3, 51.28; 4, 28.12; 5, 83.89; 6, 65.34; 7, 76.81; 8, 66.02; 9, 27.24; 10, 26.13; 11, 77.71;

At the time of k=6, the throughput of path 1 is 67.06; 2, 26.52; 3, 63.04; 4, 36.31; 5, 105.61; 6, 80.2; 7, 94.59; 8, 84.02; 9, 36.57; 10, 34.5; 11, 99.14;

At the time of k=7, the throughput of path 1 is 75.64; 2, 31.84; 3, 71.53; 4, 38.22; 5, 118.34; 6, 92.93; 7, 107.08; 8, 64.02; 9, 42.15; 10, 41.71; 11, 109.64;

At the time of k=8, the throughput of path 1 is 80.64; 2, 34.42; 3, 76.67; 4, 39.61; 5, 125.59; 6, 101.15; 7, 119.26; 8, 101.35; 9, 46.38; 10, 44.91; 11, 115.25;

At the time of k=9, the throughput of path 1 is 91.71; 2, 38.64; 3, 86.38; 4, 46.61; 5, 141.86; 6, 115.1; 7, 137.19; 8, 115.67; 9, 52.71; 10, 51.68; 11, 130.32;

At the time of k=10, the throughput of path 1 is 105.54; 2, 50.27; 3, 99.41; 4, 55.66; 5, 158.65; 6, 130.21; 7, 153.52; 8, 131.32; 9, 60.73; 10, 60.5; 11, 141.1.

The mean square error is 41.54 when k=10. It shows the algorithm can allocate properly network throughput. The guiding information in signs can avoid rapid throughput increase in some road path and helps to reduce traffic time along with time, marching need of OD and increasing throughput.

The information processing of the invention is to acquire marching needs and path sets of objects and then to calculate throughput allocation in path set to assure object's priority, matching output information with prioritized guiding information in order to enhance accuracy and efficiency.

Furthermore, the guiding signs system can direct objects to reasonable path via coordination of guiding signs and dynamic guiding information to reduce traffic pressure and increase the accuracy of guiding signs.

At this point, the technicians of this field should be aware that, multiple examples of invention have been fully detailed and described in this article, however, in the case of not backing away from the essence and scope of present invention, according to the content of this invention, many other variations or modified form, which correspond to the principle of the invention, still can be determined directly and deduced. Therefore, the scope of the invention should be understood and recognized as covering all these other variations or modified form.

What is claimed is:

1. A guiding signs system comprising:
a plurality of guiding signs for outputting information, related to an end point, that changes in real time according to paths towards the end point, and
an information processor to acquire marching needs and path sets of objects that move in a path towards the end point,
wherein the marching needs includes quantities of objects that move and the path sets include all passages from a starting point to the end point; the passages include nodes and roads in between, and each node has one or more guiding signs of the plurality of guiding signs,
wherein the information processor calculates a statistical distribution in the path sets of each of the objects that move according to the marching needs, and determines a priority on each road of each of the objects that move according to the distribution of each of the objects that move in the path sets, and wherein each guiding sign of the plurality of guiding signs is configured to output the priority of each of the objects that move on each road towards the destination point; wherein the objects comprise pedestrians or vehicles moving towards the end point.

2. The guiding signs system of claim 1, further comprising multi-direction signs, physically located at crossroads of the nodes, which are sub-signs to point to various directions and can form prioritized sign images via change in color or pattern of the sub-signs.

3. The guiding signs system of claim 1, further comprising dynamic display screens, set on the nodes, to display ambient aggregate passenger throughput and guidance information in order to form prioritized sign images.

4. The guiding signs system of claim 1, further comprising emergency sensors to detect emergency within the path sets, and include emergent evacuation signs with information about evacuation direction in case of emergency.

5. The guiding signs system of claim 1, further comprising information gathering devices to calculate the marching need via mobile devices or path inquiries of the objects that move.

6. The guiding signs system of claim 1, wherein the information processor includes an ant colony system algorithm to assure an aggregate throughput of objects in each road.

* * * * *